United States Patent
Bugno et al.

[11] Patent Number: 6,023,229
[45] Date of Patent: Feb. 8, 2000

[54] REARVIEW MIRROR WITH INTERNALLY-MOUNTED COMPASS SENSOR

[76] Inventors: Mark D. Bugno, 5959 St. Joseph Ave., Stevensville, Mich. 49127; Timothy A. Bonardi, 14864 Broceus School Rd., Buchanan, Mich. 49107; Andrew J. LeVesque, 17009 Ventura Dr., Holland, Mich. 49424

[21] Appl. No.: 09/260,267

[22] Filed: Mar. 2, 1999

[51] Int. Cl.[7] .................................................. G08B 23/00
[52] U.S. Cl. ................... 340/693.5; 340/438; 33/355 R; 33/356; 33/333
[58] Field of Search ............................ 340/693.5, 693.9, 340/693.12, 438; 33/355 R, 356, 361, 333

[56] References Cited

U.S. PATENT DOCUMENTS

| | | | |
|---|---|---|---|
| 4,581,827 | 4/1986 | Higashi | 33/333 |
| 5,339,529 | 8/1994 | Lindberg | 33/355 R |
| 5,455,716 | 10/1995 | Suman et al. | 359/838 |
| 5,644,851 | 7/1997 | Blank et al. | 33/361 |
| 5,708,410 | 1/1998 | Blank et al. | 340/438 |
| 5,737,226 | 4/1998 | Olson et al. | 364/457 |
| 5,802,727 | 9/1998 | Blank et al. | 33/361 |

OTHER PUBLICATIONS

U.S. Application No. 279,643, 19 pages, 3 sheets of drawings–abandoned (parent of 5,699,044 patent).

*Primary Examiner*—Jeffery A. Hopsass
*Assistant Examiner*—Sihong Huang
*Attorney, Agent, or Firm*—Rader, Fishman, Grauer & McGarry, an office of Rader, Fishman & Grauer, PLLC

[57] ABSTRACT

A rearview mirror assembly is provided for a vehicle which incorporates a self-contained magnetic field sensor in the mirror housing. When mounted to a fixed pivot point in a single ball mounting bracket, the mirror housing pivots around the magnetic field sensor. When the magnetic field sensor is mounted within the mirror housing either to the housing or to the mirror, compensation for the rotation position of the mirror about a vertical axis is provided by an empirically predetermined compensation value whereby direct reading of the angle is adjusted by a processor or by mechanically mounting the field sensor at an angle representative of the compensation value. Other ways of rotation compensation are also disclosed. Compensation for tilt about a horizontal axis is provided by an elliptical compensation algorithm in a microprocessor.

7 Claims, 6 Drawing Sheets

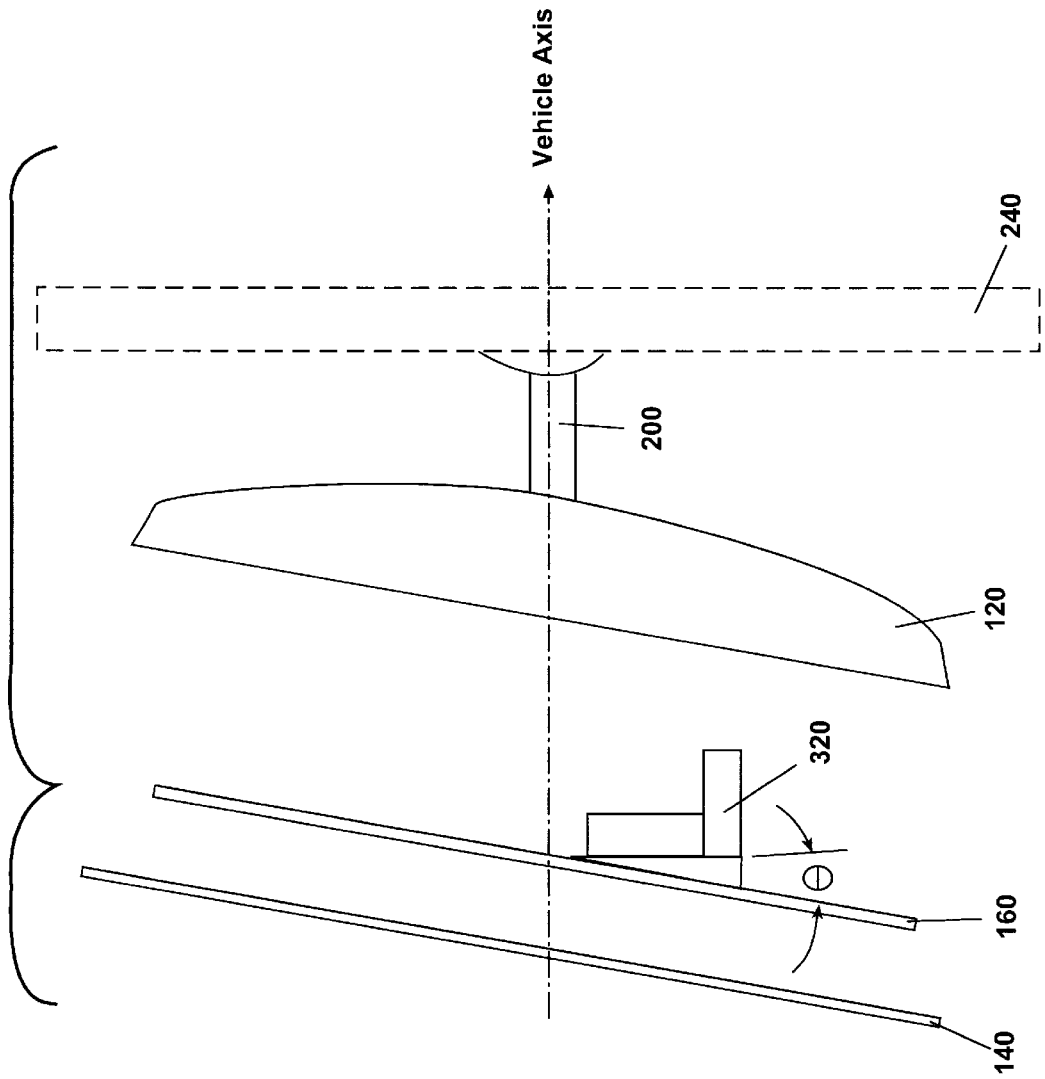

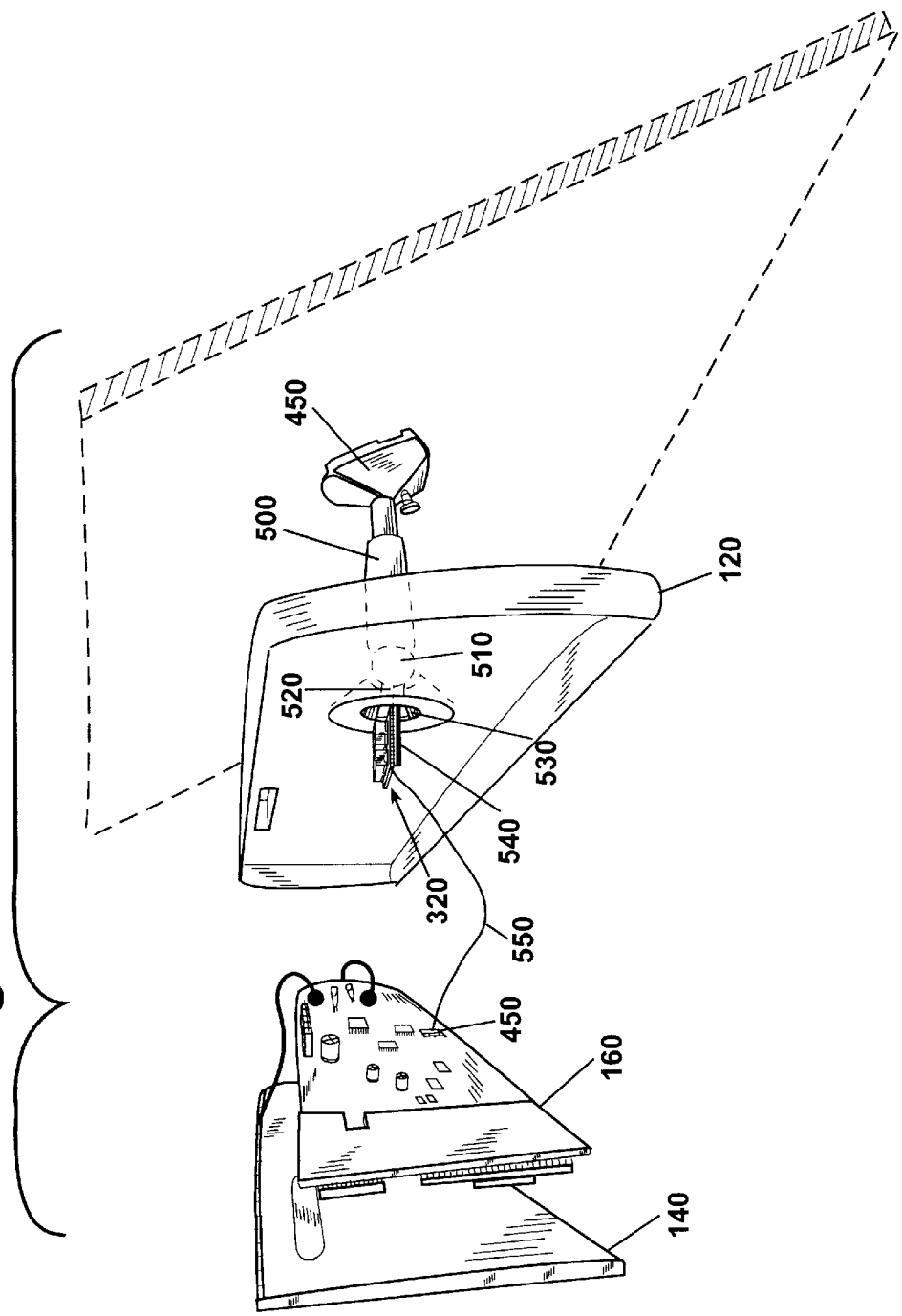

REARVIEW MIRROR WITH INTERNALLY-MOUNTED COMPASS SENSOR

BACKGROUND OF THE INVENTION

1. Field of the Invention

The present invention relates to rearview mirrors on vehicles and particularly to rearview mirrors associated with magnetic direction sensing systems.

2. Related Art

It is known to associate compass systems with rearview mirrors in vehicles. FIG. 1 illustrates an example of a known rearview mirror assembly incorporating such a compass system. The mirror assembly 10 comprises an open-faced mirror housing 12, a mirror 14, and a circuit board 16. The mirror 14 includes an electrochromic element driven by a driving circuit 18 for automatically changing mirror reflectance as a function of glare. It will be understood that, as typically, the mirror 14 can be a simple plain mirror with a prism mechanism (not shown) to enable reduction of night time glare.

The housing 12 is mounted to the vehicle by way of a pivot connection 20 and a bracket housing 22. In FIG. 1, the mirror housing 12 is shown mounted to the bracket housing 22 on a windshield 24 of the vehicle as in the case of an interior rearview mirror assembly. The pivot connection 20 shown in FIG. 1 comprises a ball 26 fixedly mounted to the mirror housing 12 and pivotably mounted in a socket of a spacer 28. The other end of the spacer 28 carries a socket which receives another ball 30 which is fixedly secured to the bracket housing 22. It can be seen that the typical mirror housing 12 is thus pivotable relative to the vehicle windshield 24 by manually rotating either of the balls 26, 30 in their respective sockets. It is also known to use a single ball and socket pivot to mount a mirror housing to a vehicle. Further, it is known to incorporate a motorized actuating mechanism in the housing 12 wherein the housing can be pivoted relative to the vehicle by remote actuation of a switch.

The compass system of FIG. 1 comprises a magnetic field sensor 32 mounted in the bracket housing 22 for detecting the earth's magnetic field and for providing electrical signals representative of the magnetic field to the circuit board 16 through a wire 34 to the circuit board 16. Connector 36 on the circuit board 16 extends into an aperture 37 in the mirror housing 12 to deliver power and signals to and from other mirror system components. The wire 34 extends through a notch in the aperture 37 to a connector 45 on the circuit board 16. The circuit board 16 carries a processing circuit 38 that processes signals from the sensor 32 and provides a representative output signal to a display 40. In the example of FIG. 1, the display 40 can be visually seen by an observer through a transparent window 42 in the mirror 14.

The magnetic field sensor 32 comprises an X axis sensor 44, perpendicular to the vehicle's direction of travel, and a Y axis sensor 46, in line with the vehicle's direction of travel. Moreover, both sensors 44, 46 are mounted parallel with the earth's surface. In other words, the magnetic field sensor 32 is fixed relative to the vehicle. The magnetic field sensor 32 is typically a flux-gate sensor, although other types of magnetic field sensors are in known use.

Various calibration circuits, such as those disclosed in U.S. Pat. Nos. 4,953,305 and 5,761,094, are employed to compensate for changes in vehicle magnetic field, which can be caused by aging or by other influences such as roof mount magnetic antennas, car washes and electric railway systems.

The present system, such as that illustrated in FIG. 1, works well, but there has long been a need to reduce the size of the bracket housing 22 and the component count. Moreover, there is a need to free up space for other circuits, such as GPS, rain sensors, S-band antennas and the like. For electrochromic mirrors especially, a large bracket housing reduces light level to the ambient sensor aperture in the mirror housing. Attempts have been made to mount the magnetic field sensor in the mirror housing, but heretofore, such attempts have failed because the pivotability of the mirror housing itself introduced unacceptable errors into the compass accuracy. In addition to errors introduced in the X and Y axes because of the horizontal rotation of the mirror, the vertical pivot or tilt of the mirror introduced errors in the Z axis. A known form of compensation to account for tilt of the magnetic field sensor out of the X-Y plane is elliptical or gain compensation algorithms that are used to adapt readings to differing windshield angles and variations in sensor sensitivities. Typical processing systems use 8 bit math, giving a resolution of about 1.4°. Round-off error plus sensor errors typically combine to give a ±6° system performance. Moreover, remote mounting of the magnetic field sensor from the processing circuit in the mirror housing introduced noise into the system which often required the necessity of EMI filterings to reduce noise levels. The wire harness, connectors, housing, and EMI filtering components all add cost to the mirror.

SUMMARY OF THE INVENTION

In the present invention, a magnetic field sensor for a compass system is successfully mounted within the mirror housing. In one aspect of the invention, the magnetic field sensor is mounted directly to a circuit board in the housing wherein the circuit board is pivotable with the mirror. A predetermined compensation angle is incorporated in the processing circuit to account for a typical rotation position of the mirror relative to the vehicle. In another aspect of the invention, the magnetic field sensor is fixedly mounted to a single ball pivot connection between the housing and the vehicle whereby the housing is pivotable relative to the vehicle and around the magnetic field sensor contained within the housing.

In yet another aspect of the invention, the magnetic field sensor is mounted to and pivotable with the mirror, and the processing circuit compensates for movement of the mirror in the X and Y axes by measuring a signal representing the amount of movement from a motorized actuating mechanism in the housing. In yet a further aspect of the invention, compensation of the X and Y axes is accommodated by borrowing a GPS signal from a global positioning system to measure mirror pivot relative to the direction of the vehicle. In some aspects, a pivot of the mirror about a horizontal axis relative to the vehicle is compensated by the use of elliptical compensation algorithms in the processing circuit.

Other objects, features, and advantages of the invention will be apparent from the ensuing description in conjunction with the accompanying drawings.

BRIEF DESCRIPTION OF THE DRAWINGS

In the drawings:

FIG. 5 is an alternative embodiment of the invention illustrated in the mirror assembly of FIG. 2; and FIG. 6 is another alternative embodiment of the invention illustrated in the mirror assembly of FIG. 2.

DETAILED DESCRIPTION

Figure 2:
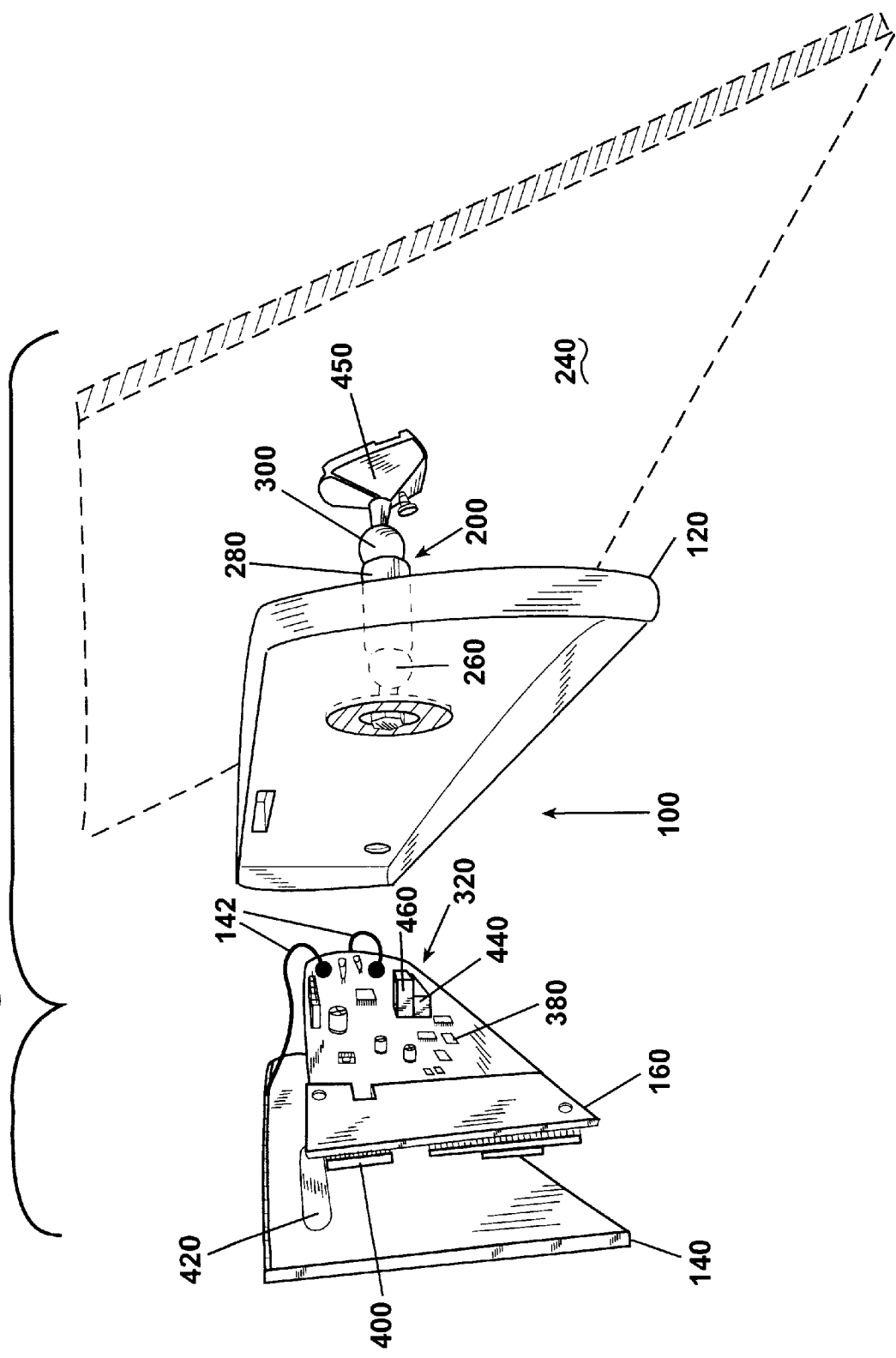
FIG. 2 is a rearview mirror assembly and compass system according to the invention.

A rearview mirror assembly 100 according to the present invention is shown in FIG. 2 comprising a housing 120, typically formed of molded plastic, a mirror 140, and a circuit board 160. The mirror 140 is shown as an electrochromic element operatively connected by wires 142 to the circuit board 160, but it will be understood that the invention is not so limited and can be prismatic or other electro-optic technology. The invention is directed to a compass heading display somewhere in the mirror housing, but not necessarily through the mirror as illustrated in FIG. 2. The heading may also be remotely displayed in the dashboard or overhead console. Consequently, the specific type of mirror is not critical to the invention.

The mirror housing 120 in FIG. 2 is pivotally connected to the vehicle windshield 240 in a conventional manner by way of a ball 260 fixedly secured to the housing 120, received in a corresponding socket in a spacer 280. In like manner, a ball 300 fixedly extending from a mounting bracket 450 is received in a socket on the other end of the spacer 280. It can be seen that the mounting bracket 450 is much smaller than the mounting bracket housing 22 of the prior art shown in FIG. 1, primarily because it is not required to house any electronics. The embodiment of FIG. 2 comprises an inside rearview mirror mounted to the windshield 240 of a vehicle, wherein the smaller profile of the mounting bracket 450 permits greater viewing area in the windshield. Also, for an electrochromic mirror element, such as at 140, more ambient light can be received by an ambient light sensor (not shown) to provide greater aperture performance for the electrochromic driver circuit. It will be understood that the invention is not so limited to an inside rearview mirror, but equally applicable to an outside rearview mirror if a compass display were desired to be associated with an outside rearview mirror. In some applications, it can be more desirable to place the magnetic field sensor in an outside rearview mirror assembly rather than an inside rearview mirror assembly. It will be understood that in an outside rearview mirror, the housing itself does not move relative to the vehicle. Rather, the mirror within the housing moves so the structure disclosed hereinafter would be adapted to accommodate these differences.

Returning to FIG. 2, the circuit board 160 carries a compass processing circuit 380 for processing compass signals to a display device 400. The display device 400 in this embodiment is a visual display observable through a transparent window 420 in the mirror 140. A magnetic field sensor 320 is mounted directly to the circuit board, comprising an X axis sensor 440 and a Y axis sensor 460. The X axis sensor 440 is mounted parallel to the circuit board 160 and the Y axis sensor 460 is mounted perpendicular to the circuit board 160 and to the X axis. When the circuit board 160 and mirror 140 are mounted in the housing 120, the X axis sensor 440 will generally be parallel to the plane of the mirror 140 and the Y axis sensor 460 will generally be perpendicular to the plane of the mirror 140 and to the X axis.

Figure 3:
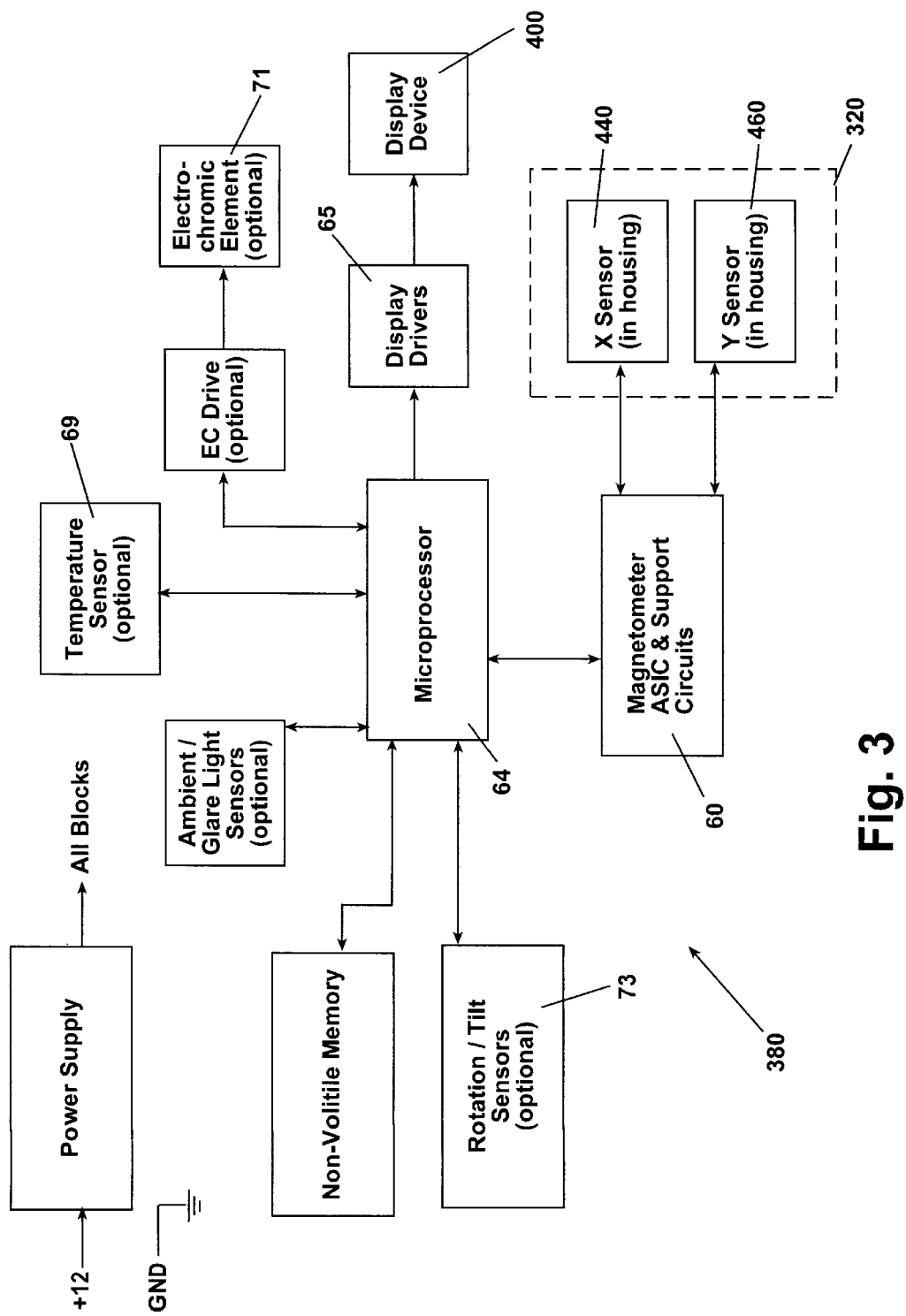
FIG. 3 is a block diagram of the compass processing circuit of the present invention.

Turning now to FIG. 3, the elements of the processing circuit 380 are shown. An application specific integrated circuit 60 (ASIC) provides drive signals to the magnetic field sensor 320 forming a two-axis magnetometer. Also, the system typically provides temperature readings for visual display in addition to compass headings. The heart of the system is a microprocessor 64 which interfaces with the ASIC 60 to gather data from the magnetic field sensor 320, processes that data and sends the resulting display signal by way of appropriate display drivers 65 to the display device 400. The processor 64 provides continuous calibration and other algorithms to the system to render more accurate compass readings. The processing circuit 380 can also handle data to and from optional accessories well known in the art, such as ambient glare light sensors 67, temperature sensors 69 and electrochromic elements 71. Also, other rotation and tilt sensors 73, other than or in addition to the magnetic field sensor 320, can be connected to the processor 64.

Figure 1:
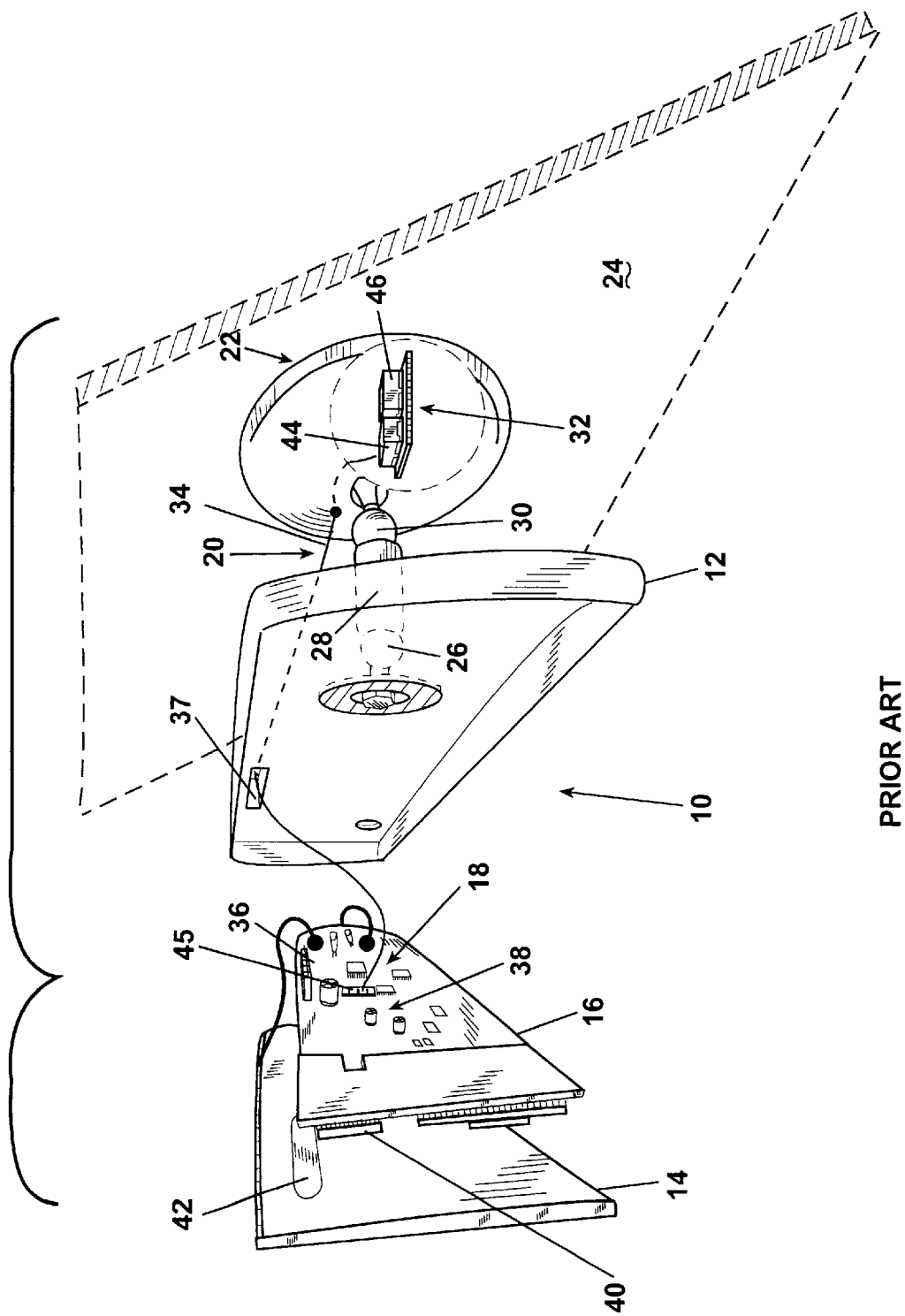
FIG. 1 is a prior art rearview mirror assembly and compass system.
Figure 4:
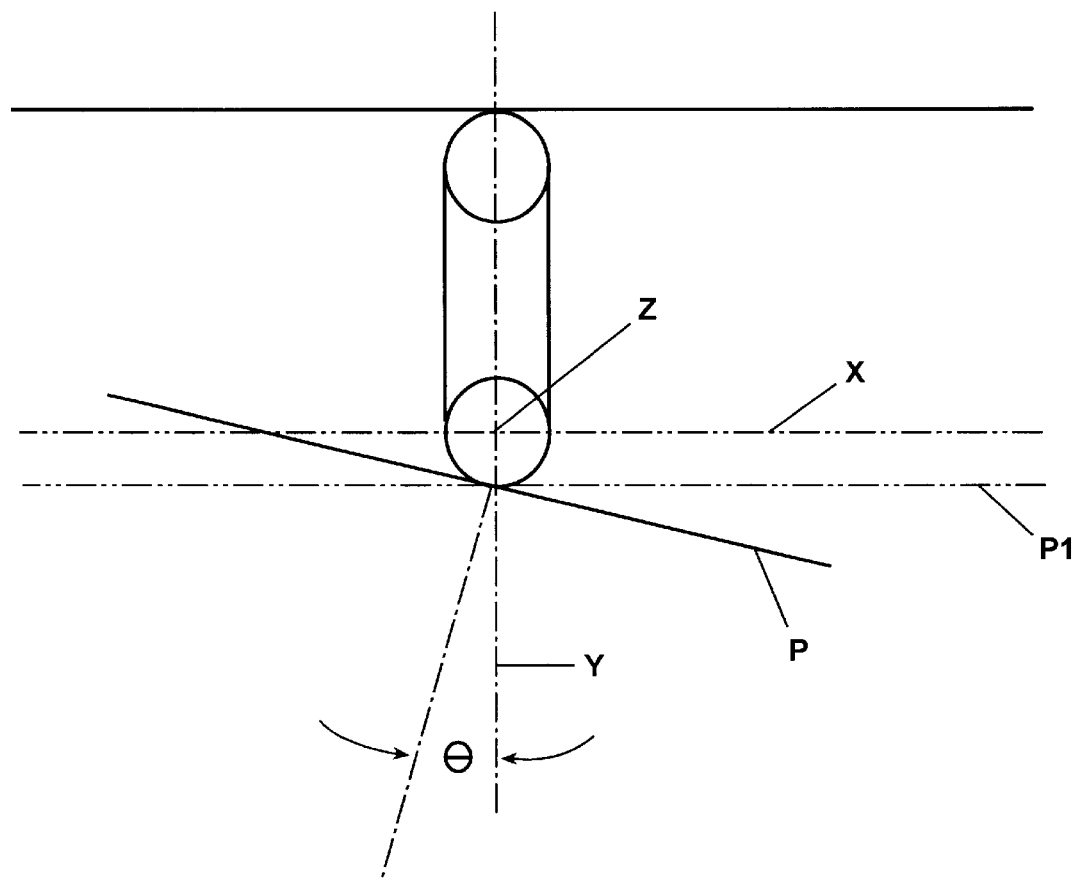
FIG. 4 is a plan view schematic diagram showing typical rotation range of a mirror housing in the X, Y plane.

It will be apparent that the mirror housing 120 carrying the magnetic field sensor 320 is capable of pivoting about any one or more of three axes relative to the vehicle. Looking at FIG. 4, if the Y axis is defined as the axis aligned with the direction of the vehicle, the X axis is defined as the axis perpendicular to the Y axis and parallel with the earth's surface, and the Z axis is defined as the axis perpendicular to the X and Y axes, the frame of reference of the magnetic field sensor 320 will be clear relative to the plane P of the mirror 140. If the mirror 140 were positioned at the phantom line P1 in FIG. 4, it would be parallel to the plane defined by the X and Z axes and perpendicular to the Y axis. The magnetic field sensor 320 would be positioned as if it were mounted to the vehicle as shown in FIG. 1. However, it will be apparent that when the mirror 140 is in use, it would be rotated roughly to a position shown by plane P in FIG. 4, and further tilted downward out of parallel with any of the three axes X, Y, or Z. In such a position, the magnetic field sensor 320 (fixed relative to plane P) will be at an angle $\theta$ relative to the direction of the vehicle and will no longer be perpendicular to the X, Y plane. Without compensating for this additional movement, the compass system will likely display inaccurate readings.

Referring again to FIG. 3, an elliptical compensation (or gain compensation) algorithm of the type disclosed in U.S. Pat. No. 4,953,305 is incorporated into the microprocessor 64 to compensate for the tilt of the magnetic field sensor 320 out of the X, Y plane. It is also conceivable to incorporate a third Z axis field sensor in the magnetic field sensor 320 which will send a signal to the processing circuit 380 for direct processing of the signal relative to a data mean. In this case, the magnetic field strength would be represented by an XYZ vector. If the magnitude of the resultant of the X, Y, Z vector remains unchanged and the X, Y magnitude suddenly changes, it is likely that the mirror has been tilted, and a quick calibration check can be performed (as described in U.S. Pat. No. 5,737,226 for abrupt changes in vehicle field).

Compensation for the angle $\theta$ can be obtained in one of several ways. In one way, it has been determined that in a sample of different sized drivers in different sized vehicles, the typical angle $\theta$ is between 15° and 21°. Most American original equipment manufacturers will accept a typical error of ±10° for generating the final display readout because the display does not indicate the heading of the vehicle in degrees. Rather, vehicle heading is indicated in any one of eight boxed directions on the 360° compass (each of which has a 45° range: N, NE, E, SE, S, SW, W, NW). According to the invention, a ±3° error which may result from the predetermined angle $\theta$, when coupled with other errors inherent in the system, is still within the typical manufacturer's requirement of ±10°. Thus, the microprocessor 64 is programmed to subtract 18° from the calculated heading processed from the magnetic field sensor, and the resulting display signal will be accurate within ±10°.

Another way to account for the angle θ is to program a lookup table into the microprocessor 64 or any nonvolatile memory, containing specific values for a given vehicle. Yet another way to compensate for the angle θ is to electrically measure the angle θ and provide a signal representing that value to the processor 64 for calculation of the real heading of the vehicle. Where there is a motorized mechanism for rotating the mirror 140 (whether or not it also tilts the housing 120), a signal can be obtained from the motorized mechanism that would reference an accurate measurement of the angle θ for further action by the processor 64. A stand-alone sensor or switch may also be used as an indication of the mirror rotation, such as one or more microswitches to signal when the mirror housing 120 has been rotated out of center or rotated more than a predetermined angle. Yet further, it is within the scope of the invention to incorporate circuitry to receive a signal from a global positioning system to measure the angle θ.

In order to further minimize the introduction of errors in the processing circuit 380, it is advisable, although not required, to use 16 bit calculations instead of the 8 bit processing of the prior art. This reduces granularity and round-off errors to improve base accuracy, increasing the maximum rotation that the system can tolerate and still be in the ±10° specification. If seat position data is available, through a bus or other connection, it may be used to approximate the mirror position if no other data is available.

An alternative embodiment for incorporating a magnetic field sensor into the mirror housing is illustrated in FIG. 5 wherein like components bear like numerals to those in FIG. 2. Here, the magnetic field sensor 320 is mounted directly to the circuit board 16, as in the embodiment of FIG. 2, but the mounting is such that the X and Y sensors 440, 460 are mounted at a predetermined angle θ relative to the circuit board 16. Preferably, based on the data referred to above, that angle θ will be 18 degrees. In this embodiment, tilt of the magnetic field sensor 320 out of the X-Y plane can be compensated for by elliptical or gain compensation. Alternatively, a predetermined optimal angle of tilt can be determined and the sensor 320 mounted to the circuit board at an angle to account for that tilt.

Another alternative embodiment for incorporating a magnetic field sensor into the mirror housing is illustrated in FIG. 6, wherein like components bear like numerals to those of FIG. 2. It can readily be seen that the principal difference between the embodiments of FIG. 2 or FIG. 5 and the embodiment of FIG. 6 is that the magnetic field sensor 320 is not mounted to the circuit board 160 and thereby fixed relative to the plane of the mirror 140, but is rather fixedly mounted to a rigid arm 500 extending from the bracket 450. In this embodiment, a ball 510 is fixedly disposed on the end of the arm 500, and the housing 120 has a socket 520 which receives the ball 510 to form a pivotal connection. An aperture 530 at the base of the socket receives an extension of the ball 510 into the housing 120 and which supports a bracket 540 on which the magnetic field sensor 320 is fixedly secured. A wire 550 electrically connects the magnetic field sensor 320 to the circuit board 160 by way of connector 455 Thus, the mirror housing 120 (and the mirror 140 and any circuit board 160 associated with the mirror) is free to pivot about the pivot connection while the magnetic field sensor 320 within the housing is fixed relative to the vehicle. In this embodiment, it is not necessary to incorporate elliptical compensation algorithms or other tilt sensors to account for a vertical tilt of the mirror. Elliptical compensation would, however, be of value with varying windshield angles.

It will be apparent to those skilled in the art that the various modifications to the preferred embodiments described and disclosed herein can be made without departing from the spirit or scope of the invention as defined by the appended claims.

What is claimed is:

1. In a rearview mirror assembly for an automotive vehicle, comprising a housing, a mirror mounted to the housing, a visual display disposed to be visible by a driver or passenger in the vehicle, an electronic compass sensor, a processing circuit adapted to receive signals from the electronic compass sensor and send a display signal representative of the vehicle heading to the visual display, and a pivot connection between the mirror and the vehicle, the improvement wherein the electronic compass sensor is mounted within the housing and pivotable with the mirror, and further comprising compensation means to compensate for pivotable movement of the mirror relative to the vehicle.

2. The rearview mirror assembly of claim 1 further comprising an electrical circuit board holding the processing circuit disposed within the housing, the electrical circuit board being pivotable with the mirror, and wherein the electrical compass sensor is mounted to the electrical circuit board.

3. The rearview mirror assembly of claim 1 wherein the processing circuit includes a microprocessor that acts upon data values associated with the compass sensor signals and the compensation means comprises adding a predetermined value, representative of a horizontal pivot angle of the mirror relative to the vehicle, to the data values.

4. The rearview mirror assembly of claim 3 wherein the predetermined value is approximately 18°.

5. The rearview mirror assembly of claim 1 wherein the compensation means comprises an elliptical compensation algorithm in the processing circuit to compensate for vertical tilt of the mirror relative to the vehicle.

6. The rearview mirror assembly of claim 1 wherein the compensation means comprises mounting the electrical compass sensor to one of the mirror and the housing at an angle relative to the mirror and housing representative of a predetermined value to compensate for average horizontal pivot of the one of mirror and the housing relative to the vehicle.

7. In a rearview mirror assembly for an automotive vehicle, comprising a housing, a mirror mounted to the housing, a visual display disposed to be visible by a driver or passenger in the vehicle, an electronic compass sensor, a processing circuit adapted to receive signals from the electronic compass sensor and send a display signal representative of the vehicle heading to the visual display, a bracket for mounting the mirror housing to the vehicle, and a pivot connection between the mirror housing and the bracket, the improvement wherein the electronic compass sensor is mounted to the bracket within the housing whereby the housing is pivotable around the electronic compass sensor while the electronic compass sensor remains fixed relative to the vehicle.

* * * * *

UNITED STATES PATENT AND TRADEMARK OFFICE
CERTIFICATE OF CORRECTION

PATENT NO.  : 6,023,229
DATED       : February 8, 2000
INVENTOR(S) : Mark D. Bugno, et al.

It is certified that error appears in the above-identified patent and that said Letters Patent is hereby corrected as shown below:

On the title page, insert item [73] Assignee:
-- Gentex Corporation, Zeeland MI --.

Signed and Sealed this

Eighteenth Day of July, 2000

*Attest:*

Q. TODD DICKINSON

*Attesting Officer*    *Director of Patents and Trademarks*